United States Patent [19]

Yamaguchi et al.

[11] Patent Number: 4,817,185
[45] Date of Patent: Mar. 28, 1989

[54] OPTICAL CHARACTER READER

[75] Inventors: Mikio Yamaguchi; Koji Sato, both of Osaka, Japan

[73] Assignee: Sumitomo Electric Industries, Ltd., Osaka, Japan

[21] Appl. No.: 71,712

[22] Filed: Jul. 9, 1987

[30] Foreign Application Priority Data

Jul. 11, 1986 [JP] Japan .................. 61-164287
Jul. 16, 1986 [JP] Japan .................. 61-167338

[51] Int. Cl.⁴ .............................. G06K 9/22
[52] U.S. Cl. ........................ 382/59; 382/18; 382/65
[58] Field of Search .............. 382/59, 63, 65, 68, 382/18, 48; 235/472

[56] References Cited

U.S. PATENT DOCUMENTS

| | | | |
|---|---|---|---|
| 3,930,228 | 12/1975 | Spanjersberg | 382/9 |
| 4,104,616 | 8/1978 | Isshiki et al. | 382/59 |
| 4,180,800 | 12/1979 | Isshiki et al. | 382/59 |
| 4,355,301 | 10/1982 | Isshiki et al. | 382/59 |
| 4,389,634 | 6/1983 | Nakamura | 382/59 |
| 4,512,032 | 4/1985 | Namba | 382/9 |
| 4,527,283 | 7/1985 | Ito et al. | 382/48 |
| 4,542,528 | 9/1985 | Sanner et al. | 382/59 |

*Primary Examiner*—Leo H. Boudreau
*Assistant Examiner*—Joseph Mancuso
*Attorney, Agent, or Firm*—Cushman, Darby & Cushman

[57] ABSTRACT

The invention provides an optical character reader (OCR) utilizing prioritized horizontal OR ranges for enhanced accuracy and ease of use. A light source illuminates a price tag or the like on which characters have been imprinted generally along a horizontal direction of the sheet. A lens system images the characters onto an image sensor having a field of vision covering a plurality of characters, the image sensor including a plurality of photo-electric conversion elements arranged in a matrix. A binary coding circuit digitizes outputs of the photo-electric conversion elements, which define picture elements (pixels), of an image in the field of vision of the image sensor, into binary signals representing black and white picture elements. A hand holdable scanner incorporates the light source, image sensor, lens system and binary coding circuit. An identifying circuit identifies characters from binary-coded data. The OCR utilizes at least two horizontal OR ranges in the field of vision of the image sensor. When the horizontal OR range of higher priority detects a character line, the result of character line detection is output. When none of the horizontal OR ranges detects a character line, it is determined that there is no character line. The character line detecting operation of each of the horizontal OR ranges is the same as that in the conventional OCR. However, in the OCR according to the present invention, the horizontal OR ranges are spread horizontally. Therefore, even in the case of a price tag which is long enough to have characters arranged along one of its sides, the character line or lines can be positively detected. Since at least two horizontal OR ranges are provided in the field of vision of the image sensor, therefore the pattern of the background of the price tag and the characters on the price tag can be distinguished from each other. This means that the OCR can be used for relatively small in size price tags. The OCR conserves electric power when it is not actively "reading" data by suspending its character identifying operations when not needed. Lines having no characters are identified and, in response, character identifying operations are stopped.

9 Claims, 11 Drawing Sheets

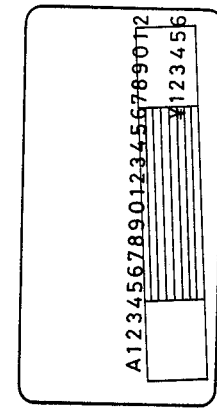
FIG. 6(a)
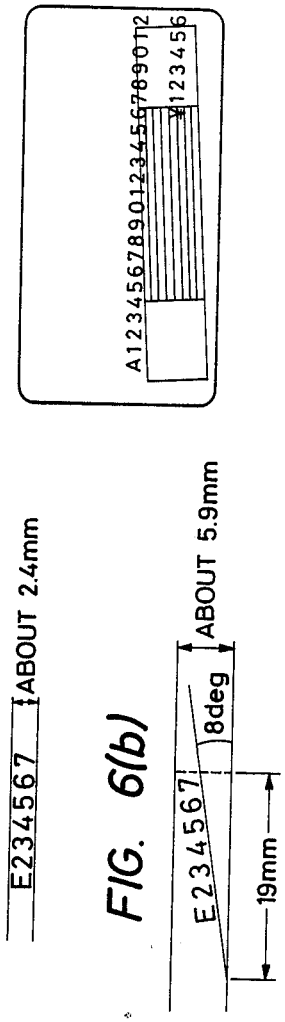
FIG. 6(b)
FIG. 7(a)
FIG. 7(b)
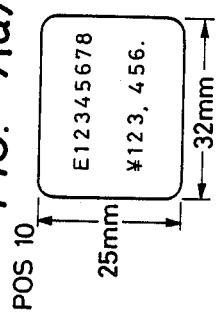
FIG. 7(c)
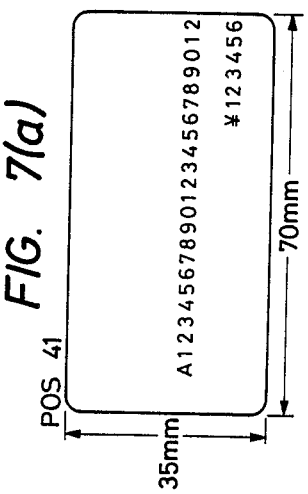
FIG. 7(d)
FIG. 7(e)
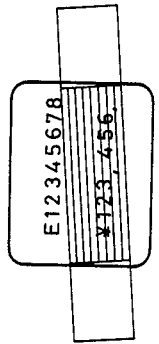

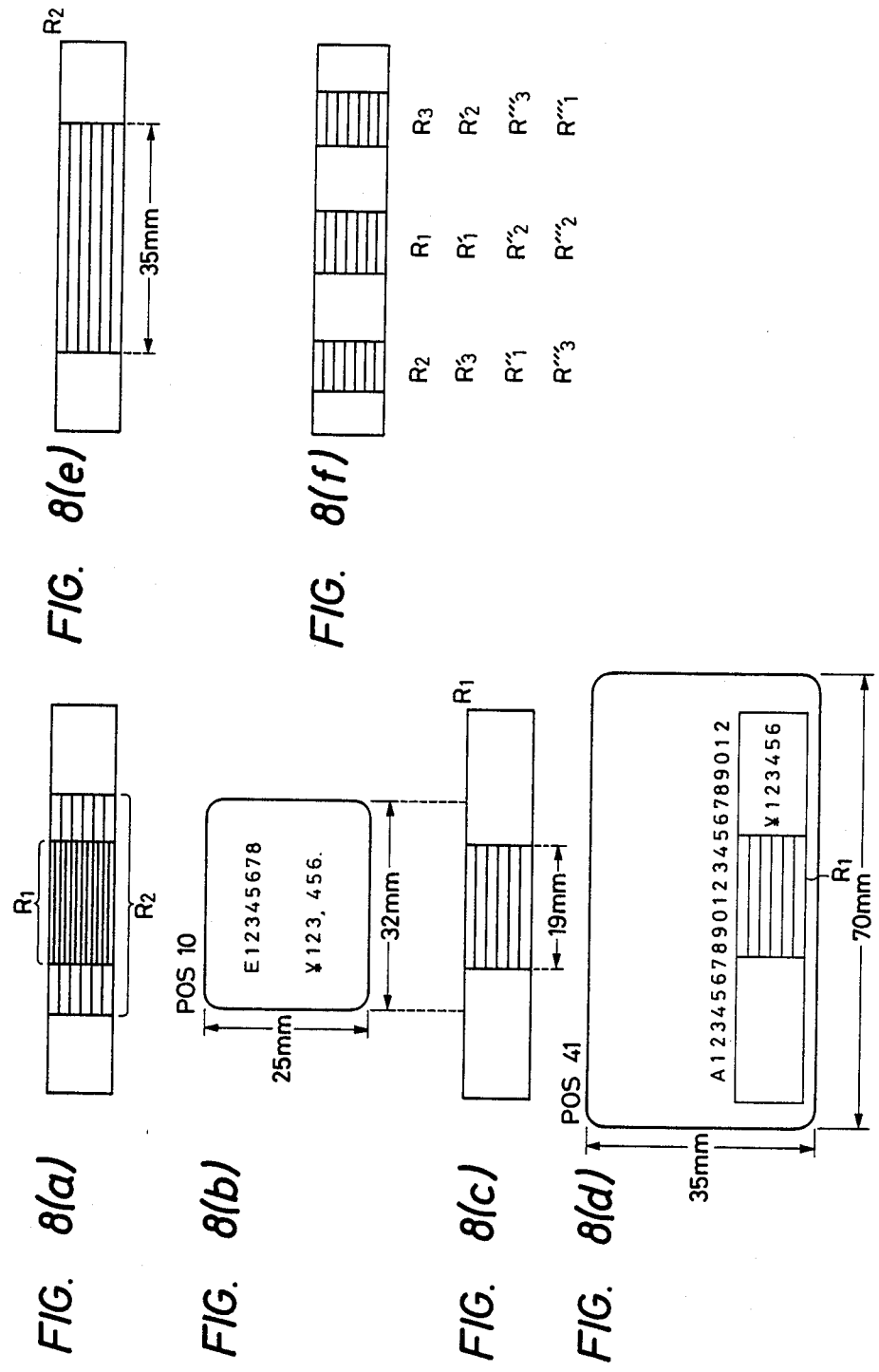

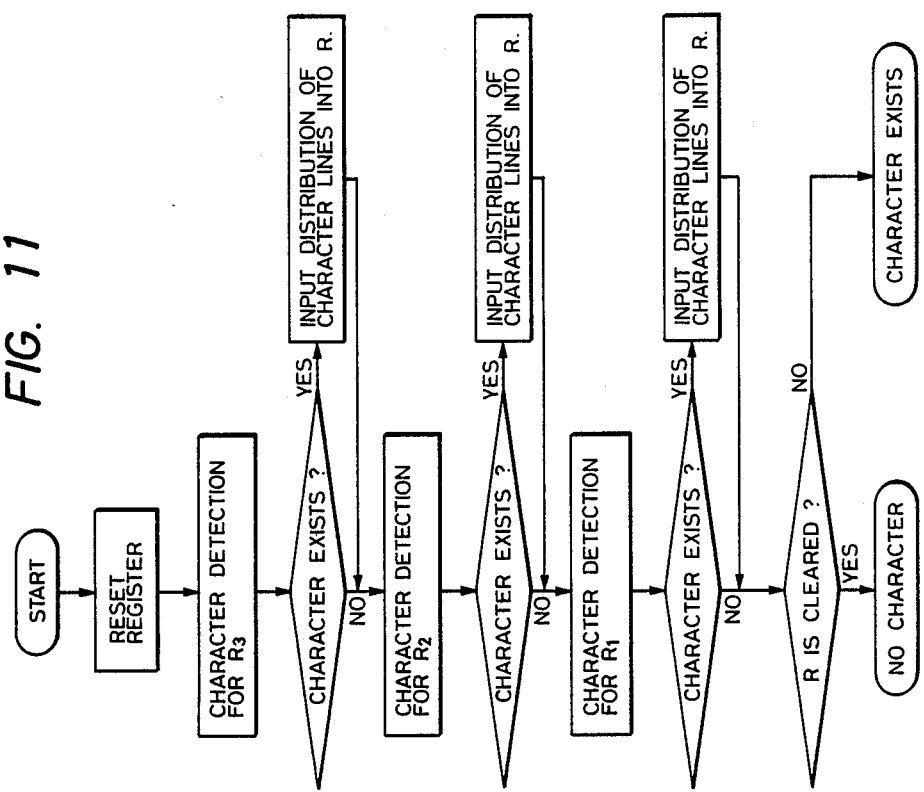
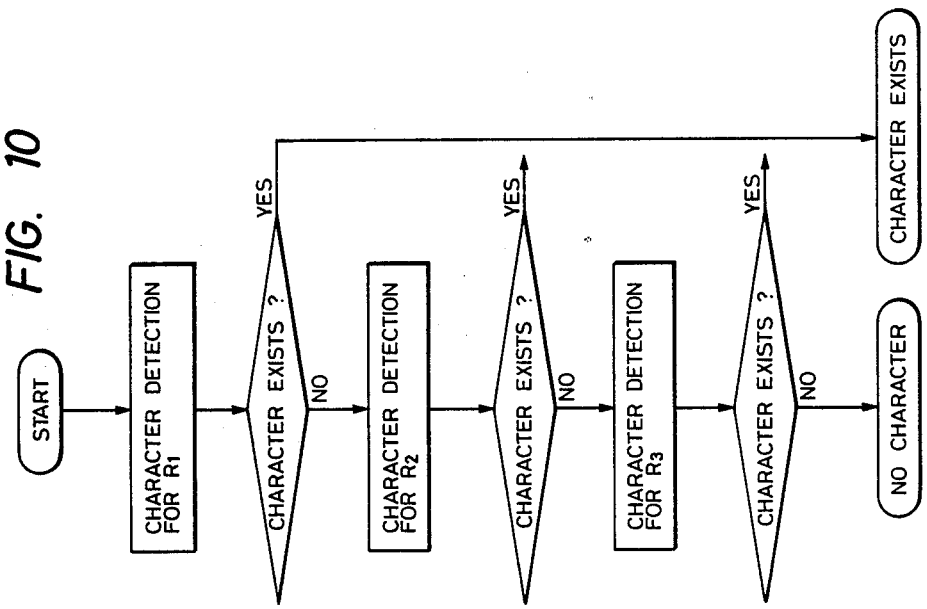

OPTICAL CHARACTER READER

BACKGROUND OF THE INVENTION (a) Field of the Invention

This invention relates in general to optical character readers (OCR) and systems using OCRs. More specifically, the invention relates to OCR systems including a hand-held scanner device for reading printed characters.

(b) Description of the Prior Art

In supermarkets and department stores, Point of Sale (POS) systems are now extensively employed. At the time of a sale, sales data for each article sold is collected for stock control, accounting, or for other purposes. In a POS system, an OCR is often used to read data from a price tag or label attached to the articles sold. This data may include a code number identifying the item sold and the price of the article.

A hand-held OCR device of the general type shown in a portion of FIGS. 1 and 2 (FIG. 2 only is "prior art") has been proposed (Japanese Patent Application No. 79082/1985) and utilized. A scanner device 21 is manipulated by an operator's hand 22 so as to be placed against a sheet 23 having characters and symbols printed thereon. Sheet 23 is, for example, a price tag on which data used in the POS system, such as an article number and a price, have been provided, but the term could include anything on which information has been provided. The term "characters" as used herein is intended to mean alphanumeric characters including "digits", "symbols" and "alphabet". The OCR is not used to read "Kanji" (Chinese characters).

A light source 24 provided on the front end of scanner 21 emits a light beam. This light beam impinges on sheet 23 and is reflected therefrom, carrying optical information indicative of what is on the sheet. The reflected light is transmitted through a lens system 25 to a sensor 26. Sensor 26 is a two-dimensional image sensor which has a field of view that is substantially equal to the area of sheet 23 on which data has been written, i.e., a price tag. The light receiving section of sensor 26 includes photo-electric conversion elements arranged in a matrix.

In each of the photo-electric conversion elements, the intensity of light applied affects some electrical parameter such as, for example, current or resistance to provide an analog electrical signal having some value. That analog value is compared with a reference voltage to obtain a digital value. The electrical signal may be converted into a high bit digital data. However, it is more preferably converted into a digital data having either of two discrete values, one corresponding to "light" and the other corresponding to "dark". Parts subjected to photo-electric conversion by the photo-electric conversion elements are referred to as "picture elements" (pixels), respectively. The picture elements are classified into two groups, light and dark groups which are represented by the values "0" and "1", respectively. More specifically, the picture elements having the value "0" are referred to as "white picture elements", and the picture elements having the value "1" are referred to as "black picture elements". The picture element is the minimum unitary region in the picture processing operation. The number of picture elements present depends on the sensor being used. The field of vision of the sensor images all data on the price tag. Scanner 21 can read all data provided on a price tag, which is in the field of vision, without moving across the price tag.

A control binary-coding circuit 27 compares the output signal of sensor 26, which is provided for every picture element, with a threshold value thereby to provide a binary-coded signal, which is supplied to an image memory 28.

Image memory 28 stores the binary-coded data of the picture elements which corresponds substantially to the entire field of vision of sensor 26. The binary-coded data of the sensor 26 will be described with reference to FIG. 3.

The sensor has $p \times q$ picture elements arranged in a matrix (p picture elements in each column and q picture element in each line). The area occupied by the $p \times q$ picture elements thus arranged corresponds to the area of the data part of the sheet 23.

The picture elements are arranged regularly horizontally and vertically. A series of picture elements arranged horizontally (in a line) is designated by reference characters B1, B2, ... and Bq, respectively. Similarly, a series of picture elements arranged vertically, or in a column, will be designated by reference characters L1, L2 ... and Lp, respectively.

All the picture elements can be specified by the line and column numbers. For example, the picture element at the intersection of the m-th line and the n-th column can be expressed as "picture element (m, n)".

Reference characters B1, B2, ... and Bq designate the columns, respectively. For instance, reference character B1 designates all the picture elements arranged in the first column (the left most column). Similarly, reference characters L1, L2, ... and Lp designate the lines, respectively. For example, reference character L1 designates all the picture elements arranged in the first line (or the top line).

For every picture element, the value "0" or "1" (hereinafter referred to merely as "0" or "1", when applicable) is stored in the image memory 28. Therefore, it may be considered that FIG. 3 represents the contents of the image memory 28. The data ("0" or "1") of the picture elements can be stored with the lines an columns (m,n) as addresses.

FIG. 3 shows the digits "1", "2", "3", "4" and "5" and the characters "A" and "B" by way of example. These digits and characters are the black picture elements of "1", the remaining region, where no digits and characters are provided, are the white picture elements of "0".

The digit "1" is located in the region defined by B1 through Bn and L1 through Lm; that is, the digit "1" is formed by the picture elements of m lines × n columns.

The other digits also are formed by the picture elements which are the same in area.

In the FIG. 2 arrangement an identifying section 30 operates to identify characters and symbols one-by-one.

The identifying section 30 does not employ a method in which the lines are successively scanned in such a manner that after the first line L1 is scanned, the second line L2 is scanned. Rather, it employs a method in which the group of picture elements forming a character are scanned and the data of the character are temporarily stored in a buffer register 8 for identification. That is, the identifying section 30 operates to read the data of a character out of the image memory.

A control circuit 29 reads data corresponding to (m × n) picture elements which can be processed by the identifying section 30 and feeds the data into the buffer register 8. Buffer register 8 is made up of (m×n) registers, the contents of which are compared with the picture element value distributions of the characters and symbols which have been known in advance, to determine what the character of symbol is.

Even in the case where (m×n) is so selected as to express a character or symbol, a character may come to the border of the area (m×n) depending on a method of taking the character. This difficulty can be overcome by a method in which the group of (m×n) picture elements is moved right as much as one column, or two or three columns, and each time the identification is carried out. The group of (m×n) picture elements for a character will be referred to as "an identification window", when applicable.

The identification window is moved right as much as one picture element column or a plurality of picture element columns to identify characters arranged in a line. Thereafter, the identification window is moved downward, and moved right in the same manner to identify characters on the second line. This operation is repeatedly carried out to read all the characters.

The character identifying operation will be described in more detail.

In FIG. 3, n data (B1 to Bn) of the line L1, n data (B1 to Bn) of the line Lm are read out of the image memory 28 and stored in the buffer register 8. That is, the data of the identification window defined by 31 through Bn and L1 through Lm are stored in the buffer register 8.

The feature data of characters and symbols each formed with (m×n) picture elements have been stored in an identifying circuit 12. In identifying circuit 12, it is determined whether or not input data coincide with the data stored therein. If the input data coincides with one of the reference data, then it is determined that the input data represents that character or symbol corresponding to the reference data to which the input data coincides.

Identification of characters and symbols by using the data stored in the buffer register 8 is as described above. This character identifying principle is well known in the art, being employed in Japanese Patent Application Publication No. 6418/1984.

Next, the identification window is shifted right by one column. That is, in the lines L1 through Lm, the data of (m×n) picture elements of the (B1+1)th to (Bn+1)th columns are transferred from the image memory 28 into the buffer register 8. In the identifying circuit 12, the data thus transferred are compared with those of the characters and symbols stored therein.

The identification window is shifted right by one column again. That is, in the lines L1 through Lm, the data of (m×n) picture elements of the (B1+1)th through (Bn+2)th columns are transferred from the image memory 28 into the buffer register 8. The operation of the identifying circuit 12 is repeated.

In the same manner, the identification window is shifted right from column to column until, in the lines L1 through Lm, the data of the Bq-th column is transferred into the buffer register 8. The above-descried scanning operation permits the identification of the characters and symbols arranged in one line.

In the above-described case, the identification window corresponding to (m×n) picture elements is moved right by one picture element column. As an alternative, it may be shifted by two or three picture element columns.

When the characters and symbols in the line have been identified, the identification window is moved downward; more specifically, it is moved downward as much as about the height of the character. For instance in the case where m lines correspond to about twice the height of the character, the identification window is moved downward as much as m/2 picture element lines. That is, in the Lm/2-th through 3Lm/2-th lines, the data of (m×n) picture elements of the B1-th through Bn-th columns are transferred into the buffer register 8 so as to be identified in the identifying circuit 12.

Next, in the Lm/2-th through 3Lm/2-th lines, the data of (m×n) picture elements of the (B1+1)th through (Bn+1)th columns are transferred into the buffer register 8 and subjected to the identification process carried out by identifying circuit 12. The above-described operations are repeatedly carried out.

In the case where the identification window is shifted by one picture element column at a time horizontally, the identification must be repeated (q−n+1) times per horizontal (line) scan. If p is a multiple of m/2, the identification must be performed (2p/m) times per vertical (column) scan. Therefore, the number of times of identification in total is:

[2p (c−n+1)]/m

All of the characters and symbols in the field of vision of the sensor 26 can be read through the above-described operation.

The conventional character reading device has some operational drawbacks:

Consider the operation of placing the scanner on a price tag. The actual "reading" of characters is achieved relatively rapidly once the scanner is placed against the price tag. The period of time during which the scanner is not "reading" is relatively long compared with the time during which it is reading. It takes a considerably longer time to move the scanner to and from the price tag than it does to do the actual reading. Most of the time, the scanner sits in its stand. During "non-reading" time, it is not necessary to go through the process of identification of characters and symbols.

In such idle periods of time, it is desirable to suspend the character identifying operation to conserve electric power. The scanner should perform its character identifying operation only when a line of characters on a price tag comes into the field of vision of the sensor in the scanner. At that time, the characters should be read correctly.

If a conventional OCR were so modified to read characters or symbols only when required, then electric power could be used more economically and the reliability of the scanner would be improved.

FIG. 4 shows an arrangement wherein a scanner scans vertically, as indicated by the arrow, a price tag with characters in a plurality of lines to read the characters. In this character reading operation, sometimes there is a train of characters to be read horizontally, and sometimes not.

In a price tag, a region having a train of character will be referred to as "a character region", and a region having no train of characters as "an empty region", when applicable.

In the case of FIG. 2, the scanner is held on the price tag for a period of time to read the characters and symbols which come in the field of vision. It is difficult for the OCR to read trains of characters arranged vertically. Even if it were possible to do so, it would take a relatively long period of time, because it operates for the empty region in the same manner as for the character region. Therefore, it is desirable that the scanner discriminate the character region from the empty region and it is appropriate to consider means for detecting whether or not there is a line of characters in the field of vision of the scanner; i.e., means for detecting whether or not there is a character region in the field of vision of the scanner.

FIG. 5 shows a case in which there are characters in the field of vision. The field of vision is of 320 picture elements (in the "line" direction or horizontally)×60 picture elements (in the "column" direction or vertically). On the original, both an image pitch in the "line" direction and an image pitch in the "column" direction are 0.19 mm, and the field of vision is therefore 60.8 mm×11.4 mm.

In the upper left portion of FIG. 5, straight lines are described along four sides of each picture element to show the picture elements. Parts of characters are shown at the top of the upper left portion of Figures, and complete characters are shown at the bottom of the upper left portion of FIG. 5. There are not characters between the "parts of characters" and the "complete" characters. There are only white picture elements between the two rows of characters.

The characters are arranged horizontally, and made up of the black picture elements. Therefore, if it is detected whether the black picture element or elements are present in the horizontal direction (or in the "line" direction), then it can be determined whether character or characters are present in that direction.

In general, characters are arranged in the "line" direction to some length. Therefore, in detection of the black picture element or elements, it is not always necessary to scan the entire length of the line. The detection of the black picture element or elements can be achieved by scanning part of picture elements in the "line" direction. More specifically, a line in which at least one of W picture elements in the "line" direction is the black picture element, and a line in which none of the W picture elements are the black picture elements should be distinguished from each other.

A test range consisting of the W picture elements used for detecting the presence or absence of the black picture element will be referred to as "a horizontal OR range". The term "horizontal" of the "horizontal OR range" is based on the fact that the detection of the black picture element is made for a train of picture elements arranged in a "horizontal" direction. The term "OR" means an "OR" operation. When at least one of the W picture elements arranged in the horizontal direction is black, then the output is a logical level "1"; and when all the W picture elements are white, then the output is a logical level "0". This is essentially an "OR" operation.

Hereinafter, the operation of determining whether in the horizontal OR range, a group of picture elements in a line has at least one black picture element or not will be referred to as "a horizontal OR operation", when applicable.

By way of example, of the 320 picture elements in the "line" direction, 100 picture elements (50 picture elements on both sides of the center) will be the aforementioned "horizontal OR range"; that is, W=100 corresponding to 19 mm (in the horizontal direction) on the original.

The field of vision spreads as much as 60 picture elements in the vertical direction. Therefore, in this example, the "horizontal OR range" is a central rectangular region consisting of 6,000 (=100×60) picture elements. 110 picture elements on each side and 110 picture elements are provided on both sides of the rectangular region and they are not included in the horizontal OR range.

If, in the field of vision of the sensor, characters are not in the horizontal OR range, then the characters cannot be read. Therefore, the operator should place the scanner on the price tag in such a manner that the center of the scanner coincides with the center of a train of characters. In the case where a train of characters is longer than 100 picture elements, all that is required for the operator to handle the scanner is to allow the characters to come in the scanner's window.

In the character region, lines, the results of OR operation of which are "1", occur successively in the vertical direction. In the upper right portion of FIG. 5, reference character "L" designates the total width of vertically successive lines the results of OR operation of which are "1". The upper right portion of FIG. 5 indicates black picture element lines $L_1$ in total width in the upper portion, and black picture element lines $L_2$ in total width in the lower portion, which correspond to two trains of characters.

As is apparent from FIG. 5, the total width of black picture element lines corresponds to the height of characters. If the values $L_1$ and $L_2$ are suitable for the height of characters, then it can be determined that the characters are in the field of vision.

The total width L of black picture element lines is not always equal to the height of characters. That is, if the scanner is inclined with respect to characters, then L increases. When the "line" direction of the scanner is in parallel with the direction of arrangement of characters then L is minimum, and equal to the height of the characters.

Accordingly, it is essential to determine whether or not the value $L_1$ or $L_2$ is suitable for the height of characters. The minimum value suitable for the height of characters can be obtained when, as shown in FIG. 6(a), a character line is extended horizontally in the field of vision. The maximum value suitable for the height of characters can be obtained when, as shown in FIG. 6(b), a character line is inclined at a maximum allowable angle in the field of vision. Where the direction of the character line coincides with the "line" direction of the field of vision, L is about 2.4 mm because the height of characters is 2.4 mm. The maximum inclination angle of the character line with respect to the field of vision is 8 degrees. If, in the 19-mm horizontal OR range, the 2.4 mm high character line is inclined at 8 degrees, then L is about 5.9 mm. Thus, the value suitable for L is ranged from 2.4 mm to 5.9 mm, or 12 to 31 picture elements.

There are in use a wide variety of price tag shapes and sizes. It is desirable that an OCR be "universal" in that it is able to read any price tag or label information. However, the wide variety of price tags and labels presents a problem in determining the horizontal OR range.

Examples of a price tag will be described with reference to FIGS. 7(a)–7(e) which are price tags for POS system defined by JIS (Japanese Industrial Standard) B9551. FIG. 7(a) shows a POS-41 price tag and FIGS. 7(d) shows a POS-10 price tag.

FIG. 7(a) shows a POS-41 price tag which is 70 mm wide and 35 mm high. It has a first line of many digits at the middle level, and a second line of digits in the lower right region. In this case, not only the first line but also the second line located in the lower right region of the price tag must be detected. Therefore, the horizontal OR range should be 30.4 mm wide as shown in FIG. 7(b) corresponding to 160 picture elements. That is, the horizontal OR range is wider by 60% than that of 19 mm, or 100 picture elements shown in FIG. 6. With this wide horizontal OR range, the second line located in the lower right portion of the price tag can be detected as shown in the part (c) of FIG. 7.

FIG. 7(d) shows the POS-10 price tag which is 32 mm wide and 25 mm high. The scanner may be placed on the price tag as shown in FIG. 7(e). In this case, the price tag has a width of 32 mm, and the width of the horizontal OR range is 30.4 mm, as was described above.

If the operator places the scanner on the price tag with care, then the horizontal OR range can correctly cover the price tag (not sticking out of the price tag) as shown in FIG. 7(e). However, it is considerably difficult to do so, because of a small margin of 1.6 mm.

If the horizontal OR range sticks out of the price tag, then the background of the price tag comes in the horizontal OR range. The background of the price tag is not always white. If the background covered by the horizontal OR range is black, then the line under detection will be determined as a line including the black picture element or elements even when the portion of the price tag covered by the horizontal OR range is white. This is obviously an erroneous operation.

That is, the horizontal OR range should not stick out of the price tag. In the case of a small price tag, this requirement can be satisfied only when the person skilled in the operation of the OCR handles the scanner with care, because the margin is so small. To expect a person operating a register in a supermarket to do so is to ask too much of him. It is not practical to use an OCR that is troublesome to use.

SUMMARY OF THE INVENTION

The now claimed invention is intended to overcome the above-described difficulties attendant conventional hand-held OCR devices.

The invention provides an OCR that is easy to use and provides accurate reading of data from a small price tag. The OCR conserves electric power when it is not actively "reading" data by suspending its character identifying operations when not needed. Lines having no characters are identified and, in response, character identifying operations are stopped. The OCR arrangement according to the invention utilizes at least two horizontal OR ranges. These ranges are prioritized in advance. When the horizontal OR range of higher priority detects a character line, the result of character line detection is output.

When none of the horizontal OR ranges detects a character line, it is determined that there is no character line. An important feature of the invention is the providing of at least two horizontal OR ranges in the field of vision of the image sensor, which horizontal OR ranges are prioritized in advance.

The character line detecting operation of each of the horizontal OR ranges is the same as that in the conventional OCR. However, in the OCR according to the present invention, the horizontal OR ranges are spread horizontally. Therefore, even in the case of a price tag which is long enough to have characters arranged along one of its sides, the character line or lines can be positively detected.

At least two horizontal OR ranges are provided in the field of vision of the image sensor. Therefore, the pattern of the background of the price tag and the characters on the price tag can be distinguished from each other. This means that the OCR can be used for relatively small in size price tags.

BRIEF DESCRIPTION OF THE DRAWINGS

FIGS. 6(a)–6(b) show examples of an angle of inclination of a character line on a price tag in the field of vision of the image sensor. FIG. 6(a) is an explanatory diagram showing a character line which is in parallel with the horizontal direction of the image sensor. FIG. 6(b) shows a character line which is inclined in the field of vision of the image sensor.

FIGS. 7(a)–7(e) show horizontal OR ranges in the conventional OCR with respect to price tags. FIG. 7(a) is a diagram showing one example of a price tag large in size, namely, a POS-41 price tag. FIG. 7(b) shows the horizontal OR range in the field of vision of the image sensor of the conventional OCR. FIG. 7(c) shows field of vision of the image sensor of the conventional OCR placed over the POS-41 price tag. FIG. 7(d) is a diagram showing one example of a price tag small in size, namely, a POS-10 price tag. FIG. 7(e) is a diagram showing the field of vision of the image sensor placed over the POS-10 price tag.

FIGS. 8(a)–8(f) explain a second embodiment of an OCR of the invention, showing positional relationships between a plurality of horizontal OR ranges and the price tag. FIG. 8(a) shows one example of a field of vision at the center of which two horizontal OR ranges are provided. FIG. 8(b) shows the POS-10 price tag. FIG. 8(c) shows the dimension of the horizontal OR range R1. FIG. 8(d) shows the fact that a character line in the lower right region of the POS-41 cannot be detected with the horizontal OR range R1. FIG. 8(e) is a diagram showing the dimension of the horizontal OR range R2, and FIG. 8(f) is a diagram showing another example of the field of vision having three horizontal OR ranges R1, R2 and R3 which are spaced from one another.

FIG. 10 is a flow chart describing the horizontal OR operations which are conducted in the order of R1, R2 and R3 in the OCR shown in FIG. 9.

FIG. 11 is a flow chart for a describing the horizontal OR operations which are performed in the order of R3, R2 and R1.

FIG. 12(a) shows one example of the field of vision with two horizontal OR ranges 8.55 mm in width which are arranged in the longitudinal direction of the field of vision with a distance of 9.5 mm therebetween. FIG. 12(b) shows a POS-10 price tag small in size which is covered by the field of vision of the image sensor. FIG. 12(c) illustrates the case in which, even when the field of vision covers the POS-10 price tag in such a manner that the field of vision is inclined with respect to the price tag, one of the horizontal OR ranges covers a character line. FIG. 12(d) is a diagram showing the case where, even when the field of vision covers the POS-10 price tag in such a manner that the field of vision is shifted in one direction and inclined with respect to the price tag, one of the horizontal OR ranges covers a character line, and FIG. 12(e) is a diagram showing the case where, when the field of vision covers a POS-41 price tag large in size, even a character line in the lower right region of the price tag can be detected with one of the horizontal OR ranges.

FIG. 14(a) is a perspective view of the scanner, and FIG. 14(b) is a diagram showing the cases where the window of the scanner is inclined with respect to the price tag.

DETAILED DESCRIPTION OF THE PREFERRED EMBODIMENTS

Figure 1:
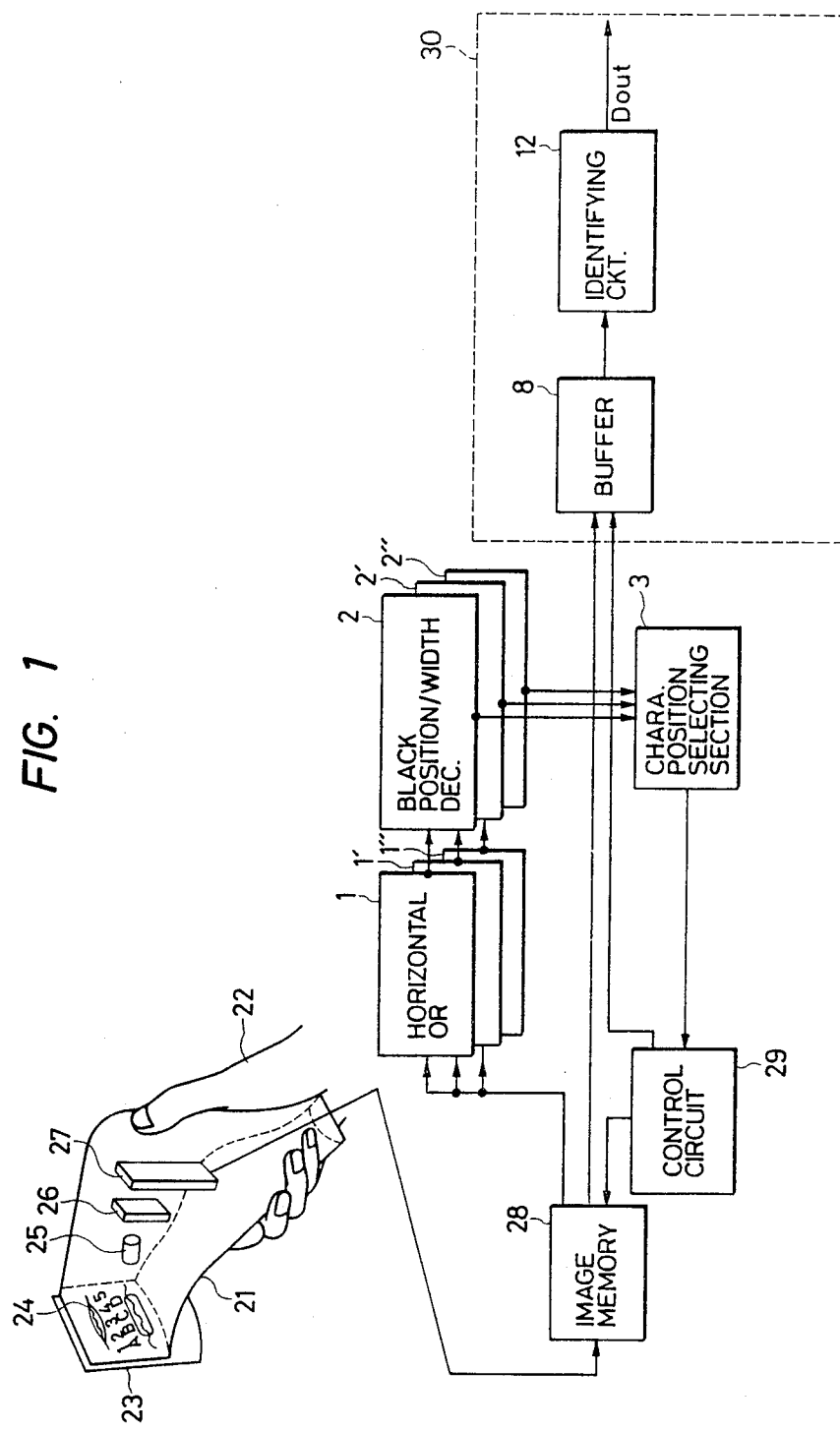
FIG. 1 is a schematic diagram, partly in block, showing a first embodiment of an OCR according to the present invention.
Figure 2:
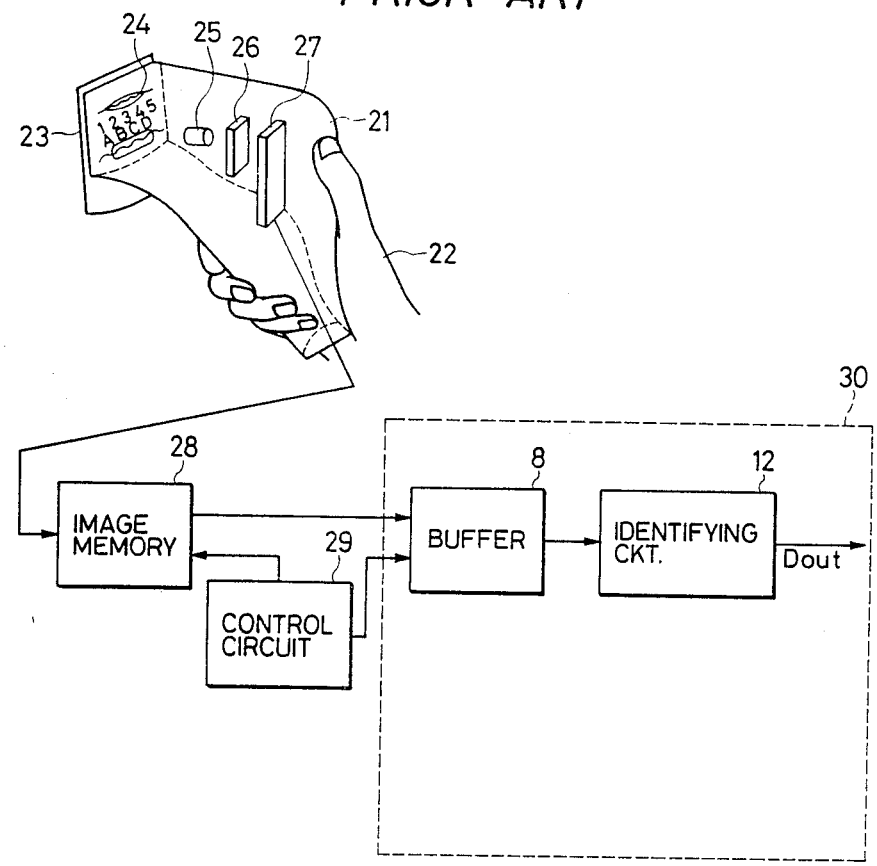
FIG. 2 (PRIOR ART) is a schematic diagram, partly in block, showing the arrangement of a conventional OCR.
Figure 3:
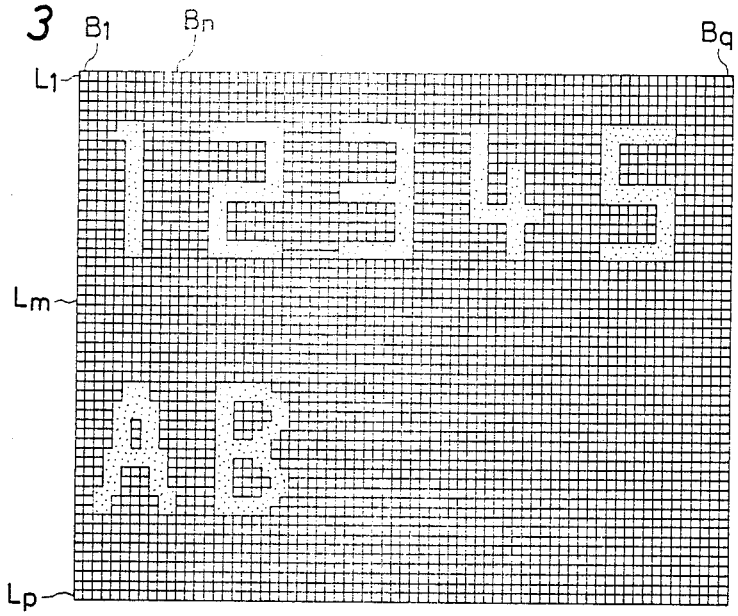
FIG. 3 is a graphic diagram showing binary-coded data provided by an image sensor. The meshes formed by horizontal and vertical lines represent picture elements, respectively.
Figure 4:
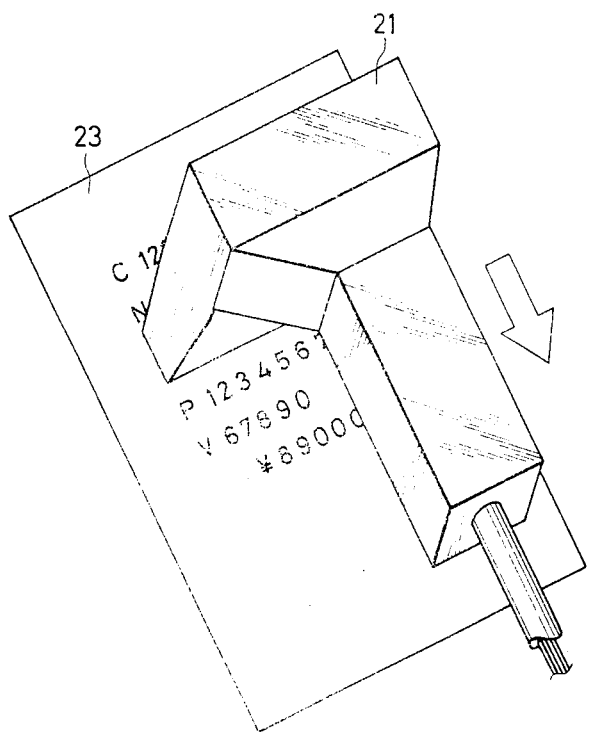
FIG. 4 shows a scanner device of the type which can be moved down a sheet being read.

FIG. 1 is a schematic diagram, partly in block, showing the arrangement of one example of an OCR according to this invention. As in the case of the above-described conventional OCR, the image is input from image sensor 26 into image memory 28. Scanner device 21 is manipulated by an operator's hand 22.

The image of characters and symbols on sheet 23 such as a price tag are read with the window of the scanner 21 placed on the sheet 23. Light source 24 is used to illuminate the sheet 23. Light reflected from sheet 23 is applied to lens system 25, so that the image of sheet 23 is formed on image sensor 26.

Image sensor 26 is a two-dimensional image sensor having a number of sensor units arranged in matrix form. Each of the sensor units produces an electrical signal corresponding to the intensity of light applied thereto. Each of the sensor units corresponds to a picture element which is a minimum image data unit.

A photo-electric conversion signal output by each of the sensor unit is binary-coded into "0" or "1" by a control binary-coding circuit 27. A white picture element corresponds to "0", and a black picture element to "1". In this manner, "0" or "1" is provided for each of the picture elements in the field of view of the scanner.

For all the picture elements, the light and dark values ("0" or "1") are input to image memory 28. That is, the image memory 28 is adapted to store the values of all the picture elements in the field of vision of the image sensor. The above-described arrangement is essentially the same as that of the conventional OCR.

In the OCR of the invention, at least two horizontal OR ranges are employed. That is, the OCR may have two, three or more horizontal OR ranges. Furthermore, these horizontal OR ranges are prioritized. In the embodiment shown in FIG. 1, three horizontal OR circuits 1, 1' and 1" are provided for three horizontal OR ranges R1, R2 and R3 in the field of vision of the image sensor, respectively. The horizontal OR circuits and the horizontal OR ranges, being independent of one another, perform their own OR operations; however, they provide outputs in the order of priority predetermined.

If, with respect to the group of picture elements covered by the horizontal OR range, at least one of picture the elements arranged in a horizontal line is black, the horizontal OR circuit outputs "1" as an operation result; and if the picture elements are all white, the circuit outputs "0". A line having at least one black picture element will be referred to as "a character line".

Figure 5:
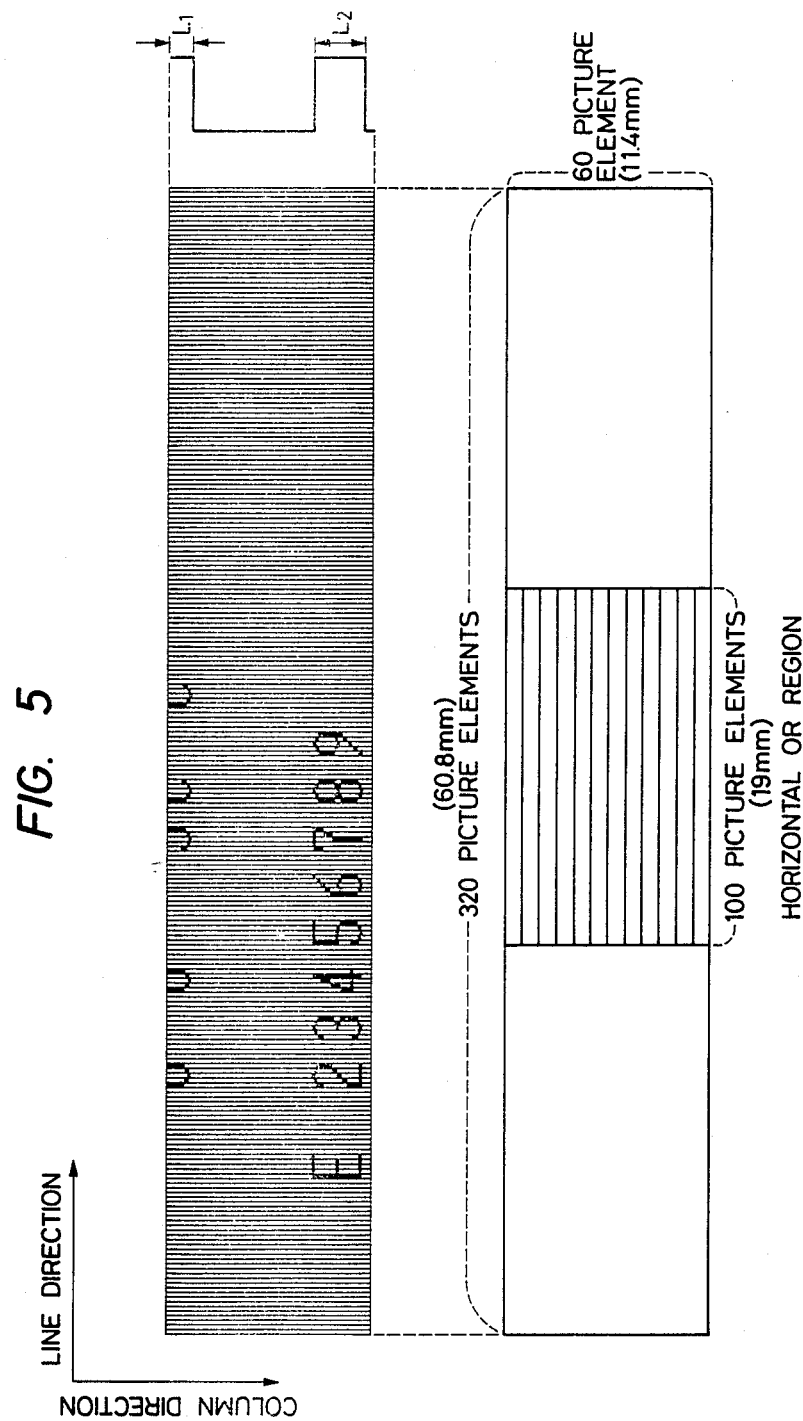
FIG. 5 explains the two dimensional field of vision of the image sensor. More specifically, the upper left portion of FIG. 5 shows picture elements defined by horizontal and vertical fine lines. The lower portion of FIG. 5 shows a horizontal OR range provided at the center of the field of vision. The upper right portion of FIG. 5 shows the results of horizontal OR operation for the arrangement shown in the upper left portion of FIG. 5.

The above-described operation is the same as that which has been described with reference to FIG. 5. In FIG. 5, reference characters $L_1$ and $L_2$ designate the total widths of character lines including at least one black picture element, respectively. The total width is substantially equal to the height of characters. The result "1" of horizontal OR operation is not always due to the characters.

As was described before, for the total width L of lines providing the horizontal OR operation result "1", the certain range has been predetermined to prove that the horizontal OR operation result "1" is due to the characters. Thus, it is necessary to determine whether the total width L is based on the characters.

For this purpose, black position/width detecting sections 2, 2' and 2" are provided for the horizontal OR circuits 1, 1' and 1", respectively. The sections 2, 2' and 2" receive the outputs of the circuits 1, 1' and 1", respectively, to determine whether the total width $L_1$ or $L_2$ in FIG. 5 of the black output is suitable for the height of characters. This determination will be referred to as "a character line detection", when applicable.

A character position selecting section 3 receives the results of character line detection from the black position/width detecting sections 2, 2' and 2", and, out of the results of character line detection through the horizontal OR ranges R1, R2 and R3, selects one according to the order of priority and supplies it to a control circuit 29. Control circuit 29 operates to start or suspend the operation of an identifying section 30.

The operation of the character position selecting can be summarized as indicated in the following Table 1. That is, Table 1 is for the OCR having three horizontal OR ranges.

TABLE 1

Results of character line detections by R1, R2 and R3 and outputs of character position selecting section

| R1 | R2 | R3 | Output of Character position selecting section |
|----|----|----|-----------------------------------------------|
| O  | O  | O  | Character line detection result by R1 |
| O  | O  | X  | Character line detection result by R1 |
| O  | X  | O  | Character line detection result by R1 |
| O  | X  | X  | Character line detection result by R1 |
| X  | O  | O  | Character line detection result by R2 |
| X  | O  | X  | Character line detection result by R2 |
| X  | X  | O  | Character line detection result by R3 |

TABLE 1-continued

Results of character line detections by R1, R2 and R3 and outputs of character position selecting section

| R1 | R2 | R3 | Output of Character position selecting section |
|---|---|---|---|
| X | X | O | No character line |

In Table 1, reference symbol O is intended to mean that it has been determined that there is a character line in the horizontal OR range, and X to mean that it has been determined that there is no character line in the horizontal OR range.

In general, in the face of n horizontal OR ranges R1, R2, ... and Rn, the order of priority is as follows:
 (i) R1 is selected first.
 (ii) In the case where no character line is present in R1 through Ri−1, and a character line is present in Ri, a detection result for Ri is used ($1 \leq i \leq n$).
 (iii) When no character line is present in Ri, detection for Ri+1 is then carried out ($2 \leq i+1 \leq n$).
 (iiii) When no character line is present in R1 through Rn, it is determined that no character line is present in the field of vision.

Embodiments of the invention having a plurality of horizontal OR ranges will be described with reference to FIGS. 8(a)-8(f). FIG. 8(a) shows an embodiment having first and second horizontal OR ranges R1 and R2 at the center of the field of vision, the former R1 being smaller in width than the latter R2. That is, in the invention, the horizontal OR ranges may be laid one on another.

In the case of a price tag small in size, a character line is detected with the first horizontal OR range R1 as shown in FIGS. 8(b) and 8(c). FIG. 8(b) shows an example of the POS-10 price tag, 32 mm wide×25 mm high. FIG. 8(c) shows only the horizontal OR range R1. As is apparent from FIGS. 8(b) and (c), the character lines of the POS-10 price tag can be detected only with the first horizontal OR range R1. The range R1 is 19 mm in width.

As shown in FIG. 8(d) in the case of POS-41 price tag, digits shown in the lower right region of the price tag cannot be detected with the first horizontal OR range R1; however, they can be detected with the second horizontal OR range R2.

The second horizontal OR range R2 is 35 mm in width as shown in FIG. 8(e). The digits shown in the lower right region of the price tag are detected with the horizontal OR range R2, and the results of detection are selectively output by the character position selecting section 3.

As was described above, characters located on one side of a large price tag can be detected with the second horizontal OR range R2. However, this is not equivalent to the provision of a single horizontal OR range R2 large in width.

In the case of a price tag small in size, both end portions of the horizontal. OR range R2 may stick out of the price tag. This can be readily understood by increasing the horizontal OR range in FIG. 7(e). In this case, the background of the price tag is covered by the two end portions of the horizontal OR range R2. However, it should be noted that the horizontal OR range R1 takes precedence over the horizontal OR range R2. The first horizontal OR range R1 is smaller in width than the second horizontal OR range R2, as was described above. Therefore, even in the case of a price tag small in size, the first horizontal OR range will not stick out of the price tag, thus covering the characters on it. That is, the range R1 detects the presence of the characters.

Since the first horizontal OR range R1 takes precedence over the second horizontal OR range R2, the result of character position detection with the first horizontal OR range R1 is selectively output by the character position selecting section 3.

The result of character position detection with the first horizontal OR range R1 is different from binary data indicating the presence or absence of a character line in the field of vision; that is, it is more complicated, indicating the local positions in the "column" direction too in the horizontal OR range R1 (19 mm×11.4 mm, or 100 picture elements×60 picture elements). The result of character position detection indicates that, in the horizontal OR range having 60 picture element lines, for instance several picture element lines from top are empty lines, the following several picture element lines are character lines, the following picture element lines are empty lines, and so forth. That is, the result of character position detection with the first horizontal OR range R1 indicate the positions of empty lines and character lines in the column direction.

Therefore, in the case of the small size price tag shown in FIG. 8(b), the character positions of "E123 ... . and " 123 ... " including the positions in the "column" direction are positively detected with the horizontal OR range R1.

In the case of the price tag shown in FIG. 8(d), no character line is present in the range R1, whereas a character line is present in the range R2. In this case, according to the order of priority the result of character position detection with the range R2 is selected; that is, " 123 ... " is detected.

If the field of vision of the sensor is located slightly above to cover the above character line "A123 ... ", then the horizontal OR range R1 take precedence over the horizontal OR range R2, so that the character position detection with the range R2 is disregarded; that is, " 123 ... " in the lower right region of the price tag is disregarded; however, this will cause no difficulty. When the scanner is shifted downwardly so that the field of vision of the scanner becomes as shown in FIG. 8(d), the character position detection with the range R2 becomes effective, so that the presence of the characters in the lower right region of the price tag is detected.

As is apparent from the above description, with the combination of the first and second horizontal OR ranges R1 and R2, the position of a character line in the "column" direction both in a small size price tag and in a large size price tag can be positively detected without being affected by the background of the price tag.

In the above-described embodiment, the first and second horizontal OR ranges are laid one on another; however, the invention is not limited thereto or thereby.

FIG. 8(f) shows another embodiment in which three horizontal OR ranges R1, R2 and R3 are separate from one another. The range R1 is at the center, the range R2 is on the left-hand side of the range R1, and the range R3 is on the right-hand side of the range R1. This arrangement means that characters in the central portion of a price tag are regarded as most important, and characters in the left-hand side next. That is, since the window of the scanner is generally placed on the central portion of the character region of a price tag, the central horizontal OR range R1 takes precedence over the others.

In the case of a price tag small in size, the distribution of character lines and empty lines can be detected only with the central horizontal OR range R1. In this case, the right range R3 and the left range R2 may stick out of the price tag; that is, they may perform erroneous character line detections being affected by the noise pattern of the background. However, this will cause no trouble in operation, because the central range R2 detects character lines, and the result of character position detection with the range R1 takes precedence over the others; that is, the results of character position detection with the ranges R2 and R3 are disregarded.

In the case where the price tag is large in size and the characters are located right as shown in FIG. 8(d), the position of the character line can be detected with the right range R3.

In the above-described embodiment, the central range R1 is the first in the order of priority, the left range R2 is the second, and the right range R3 is the third. However, the invention is not limited thereto or thereby; that is, the order of priority may be such that the right range R2' is the second, and the left-range R3' is the third.

Sometimes, depending on the configuration of the scanner, it is convenient to place the scanner on a price tag in such a manner that the price tag aligns with the left (or right) end of the field of vision. In this case, the order to priority is the left, center and right (or right, center and left), and therefore the order of priority for the horizontal OR ranges should be R1", R2" and R3" as indicated on the third line in FIG. 8(f) (or R3''', R2''' and R1''' as indicated on the fourth line in the part (f) of FIG. 8).

With respect to the position of a line including a black picture element or elements, there must be a certain range of values to determine that the black picture element or elements are of a character or characters.

For this purpose, black position/width detecting sections 2, 2' and so forth are provided for the horizontal OR circuits 1, 1' and so forth, respectively.

The sections 2, 2' and so forth receive the outputs of the circuits 1, 1' and so forth, respectively to determine whether or not the width ($L_1$ or $L_2$ in FIG. 5 of the black output is suitable for the height of characters. This operation will be referred to as "a character line detection", when applicable.

A character position selecting or combining section 3 receives data on the width L and position of the black output and data on the result of character line detection from each of the black position/width detecting sections 2, 2' and so forth, to determine the position of characters by selecting or combining these data. The data on the position of characters is supplied to a control circuit 29 which operates to start or suspend the operation of an identifying section 30.

The specific features of the OCR according to another embodiment the invention resides in the provision of a plurality of horizontal OR ranges and a plurality of horizontal OR circuits.

The horizontal OR ranges will be described with reference to FIGS. 12(a)-12(e) by way of example.

Figure 12C:
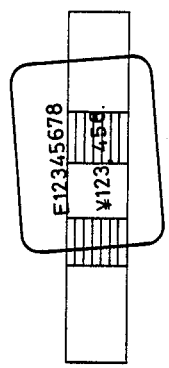
FIGS. 12(a)–12(e) are diagrams of another embodiment of an OCR according to the invention, showing positional relationships between a plurality of horizontal OR ranges and the price tags.
Figure 12D:
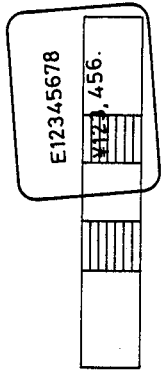
Figure 12E:
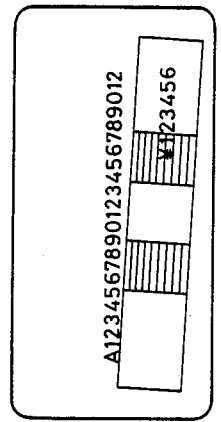
Figure 12A:
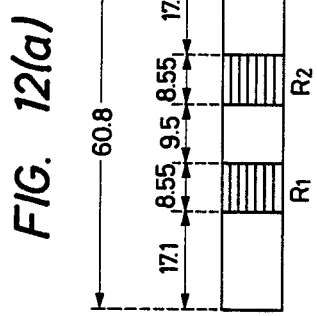

FIG. 12(a) shows the field of vision (covering the surface of an original) of the image sensor which has two horizontal OR ranges R1 and R2.

The field of vision of the image sensor is 60.8 mm wide and 11.4 long (i.e., 320 picture elements × 60 picture elements, because each picture element is 0.19 mm × 0.19 mm) similarly as in the case of FIGS. 6(a)-6(b).

The two horizontal OR ranges R1 and R2 each having a width of 8.55 mm are arranged in the horizontally elongated field of vision 60.8 in length in such a manner that the ranges R1 and R2 are spaced by 9.5 mm from each other. In FIGS. 12(a)-12(e), the horizontal OR ranges are shaded with horizontal lines.

Each of the horizontal OR ranges R1 and R2 is 8.55 mm × 11.4 mm, or 45 picture elements × 60 picture elements.

Since the two horizontal OR ranges are provided as described above, the effective width is 26.6 mm, or 140 picture elements.

It should be noted that the provision of two horizontal OR ranges is not intended to increase the effective width; that is, the key point resides in that the two horizontal OR ranges are present independently of each other.

Figure 12B:
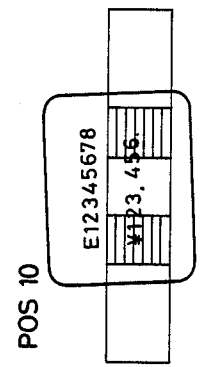

FIG. 12(b) is an explanatory diagram showing the case where the scanner is placed on the POS-10 price tag which is small in size.

In this case, both of the horizontal OR ranges R1 and R2 can be readily covered by the price tag. Therefore, the ranges R1 and R2 can detect a character line without being affected by the background of the price tag.

In the case of FIGS. 12(c) and 12(d), the horizontal OR range R1 sticks out of the price tag. This will occur frequently. In this case, the range R1 is affected by the background of the price tag.

However, the range R2, being covered by the price tag, can detect a character line. As was described above, the horizontal OR ranges R1 and R2 are independent of each other. Therefore, even when one of the ranges R1 and R2 sticks out of the price tag, the other can detect a character line, being on the price tag.

FIG. 12(e) shows one example of the positional relationship between the field of vision with the two OR ranges R1 and R2 and the POS-41 price tag which is much larger than the POS-10 price tag. A long train of digits in the middle region of the price tag will not cause any difficulty. However, there is a short train of digits located in the lower right region. The short train of digits is covered by the right horizontal OR range. The character line can be detected by the range R2, although it cannot be detected by the range R1.

The selection and addition of character line positions by the character position selecting or combining section 3 will be described with reference to FIGS. 13(a)-13(d).

In FIGS. 13(a)-13(d), the field of vision of the sensor on the surface of an original is shown to the left. The results of horizontal OR operation of the ranges R1 and R2 are shown on the right. The term "white" as used herein is intended to mean that the result of horizontal OR operation is "0" and the picture elements in that line are all white picture elements, and the term "black" is meant to mean that the result of horizontal OR operation is "1" and at least one of the picture elements in that line is black. The result of the selection and addition is shown at the rightmost end of each of FIGS. 13(a)-13(d).

Figure 13C:
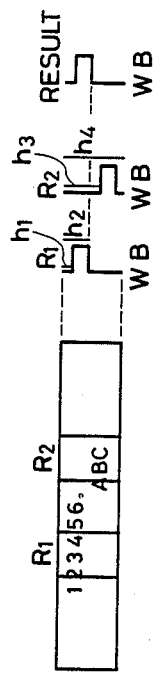
FIGS. 13(a)–13(d) describe the operation of a character position selecting or combining section.
Figure 13D:
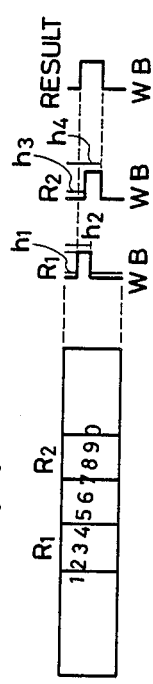
Figure 13A:
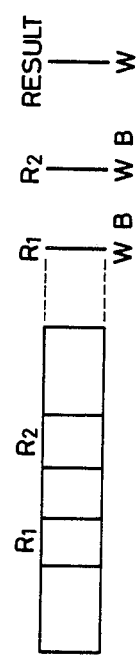

In the case of FIG. 13(a), none of the ranges R1 and R2 have detected character lines, and the result is that there is no character line.

Figure 13B:
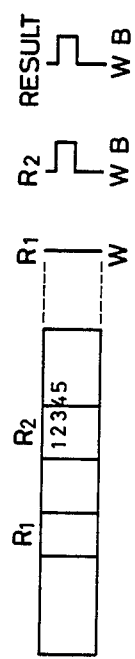

In the case of FIG. 13(b), one of the ranges R1 and R2 has detected a character line. In this case, the result of the detection is employed as a character range, as it is.

That is, the result of the horizontal OR operation of the range R2 is employed as it is.

In the case of FIG. 13(c), both of the ranges R1 and R2 have detected character lines; however, the character ranges have no common part. In this case, the upper character range is employed, the lower character range is disregarded.

More specifically, the horizontal OR range R1 has detected black picture element lines in a range of from a level $h_1$ to a level $h_2$, while the horizontal OR range R2 has detected black picture element lines in range of from a level $h_3$ to a level $h_4$ ($h_2 < h_3$). As a result, only the character range of from $h_1$ to $h_2$ is employed, and the character range detected by the range R2 is disregarded.

This treatment is different from the fact that the line of "ABC" is not read. That is, it means that, in this case, only the line of "123 . . . " located above is read because the scanner is moved downwardly.

As the scanner is further moved downwardly, the line of "123 . . . " goes out of the field of vision and the line of "ABC" comes in the field of vision so as to be read.

In the case of FIG. 13(d), both of the ranges R1 and R2 have detected a character line, and the character ranges have a common part. In this case, the sum of the character ranges is employed as a total character range in the field of vision. This means that the character line is inclined. As the character line is present continuously in a range of from a level $h_1$ to $h_4$ although it is inclined, the sum of the character ranges, i.e., the range of from $h_1$ to $h_4$ is employed as the total character range.

As was described above, in the case of FIG. 13(c), two character lines are detected, but the upper character range is selected with priority. However, as the case may be, the OCR may be so designed that the lower character range takes precedence over the upper character range, or the first priority is given to the character range closer to the center.

For instance, a scanner is available which is larger in vertical length so that, when it is placed on an original on which characters have been recorded, it may be somewhat shifted upward or downward.

Figure 14A:
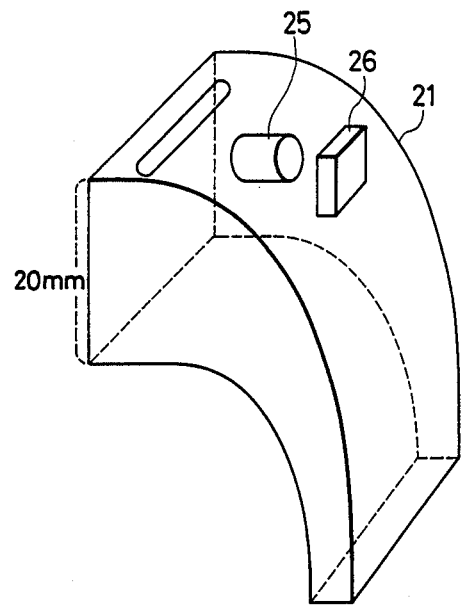
FIGS. 14(a) and 14(b) show an example of a scanner whose field of vision is relatively wide in the vertical direction.
Figure 14B:
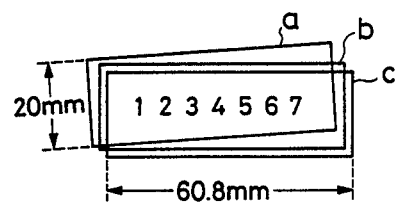

FIG. 14(a) is a perspective view showing such a scanner. The vertical dimension of the window of the scanner is 20 mm instead of 11.4 mm. The operator places the scanner on the surface of the original in such a manner that the character line aligns with the center of the field of vision (as indicated at b in FIG. 14(b). In this operation, even if the scanner is somewhat shifted upward or downward (as indicated at a or c in FIG. 14(b), the character line can be read, because the field of vision is wider in the vertical direction.

In this case, the character line to be read is present in the character range closer to the middle level in the field of vision. Therefore, when the scanner is used, the first priority should be given to the character range closer to the middle level in the field of vision.

In the embodiment shown in FIG. 1, the horizontal OR ranges R1, R2 and so forth are provided with the horizontal OR circuits 1, 1' and so forth and the black position/width detecting sections 2,2' and so forth, respectively. This arrangement is advantageous in that the horizontal OR operations and black position/width detections of a plurality of horizontal OR ranges can be carried out simultaneously, and the signal processing time is therefore short; however, it is disadvantageous in that it is not economical because of the duplication in circuitry.

Figure 9:
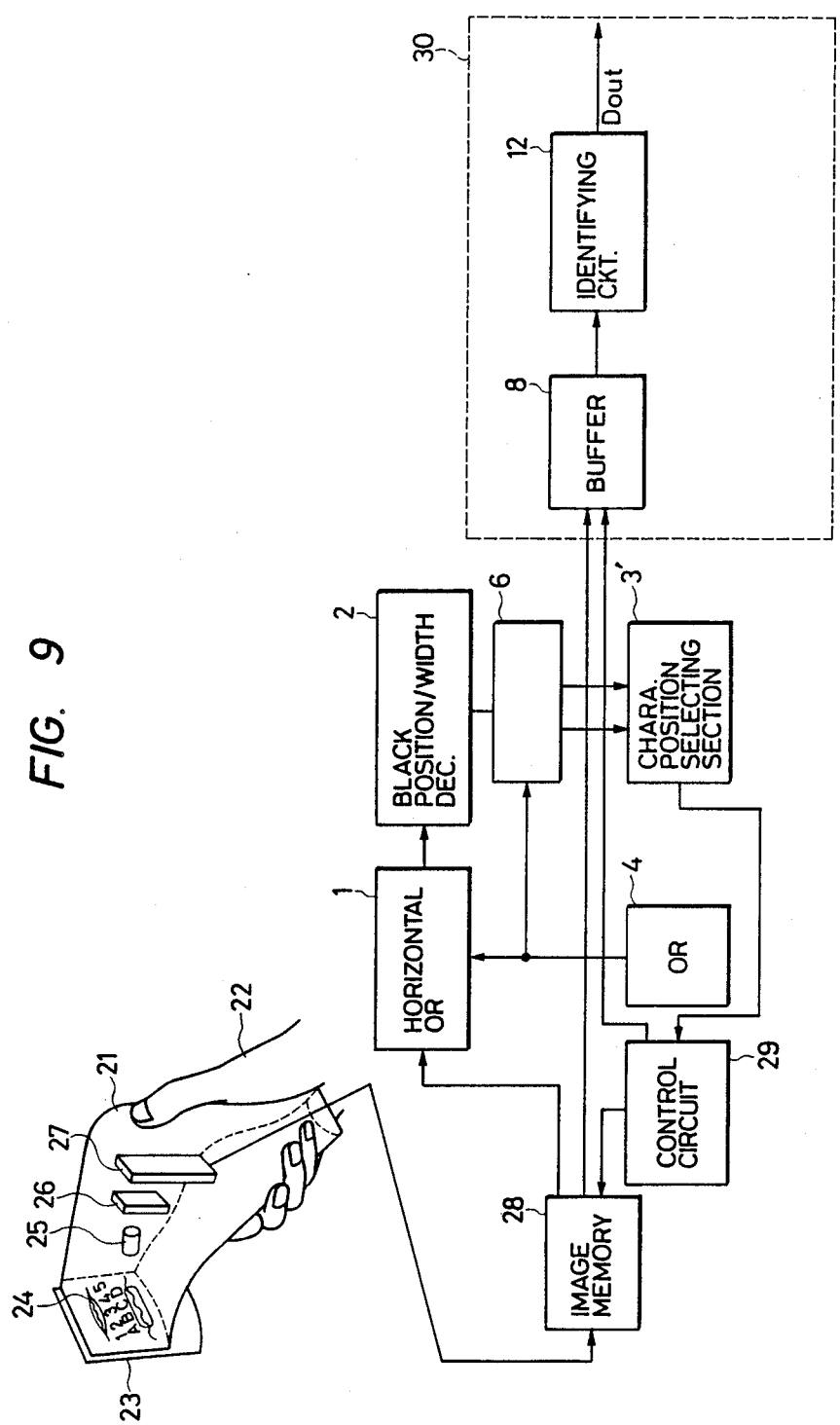
FIG. 9 is a schematic diagram, partly in block, showing another embodiment of an OCR according to the invention.

FIG. 9 shows another embodiment of this invention. The embodiment has a plurality of horizontal OR ranges R1, R2 and so on, but it, unlike the above-described embodiment, has only one horizontal OR circuit 1 and accordingly only one black position/width detecting section 2. That is, the embodiment of FIG. 9 is smaller in the number of circuit elements and accordingly more economical.

The horizontal OR circuit 1 is able to change the horizontal OR range.

The horizontal OR ranges R1,R2 and so forth have been predetermined for the horizontal OR circuit 1. These ranges are successively switched to perform the horizontal OR operations sequentially.

A horizontal OR range control circuit 4 is to switch the horizontal OR ranges successively.

The position of a character line is obtained by the black position/width detecting section 2 from the results of the horizontal OR operations, and stored in the memory 6.

In response to the horizontal OR range instruction from the horizontal OR range control circuit 4, the memory 6 stores character line ranges successively which are detected with the horizontal OR ranges R1, R2 and so forth.

A character range selecting and combining section 3' operates to receive the character line ranges of all the horizontal OR ranges R1, R2 and so forth from the memory 6, thereby to obtain a total character range in the field of vision according to the above-described operation of selection or addition.

As the horizontal OR ranges are switched in response to an instruction signal from a character position selecting section 3', the signal processing operation can be carried out substantially similarly as in the embodiment of FIG. 1.

However, the embodiment of FIG. 9 is disadvantageous in that the signal processing operation takes a relatively long time because the horizontal OR operations are successively carried out for the horizontal OR ranges R1, R2 and so forth.

FIG. 10 is a flow chart indicating a method of selecting one out of the horizontal OR ranges.

First, the character line detection is carried out for the first horizontal OR range R1. If, with the field of vision, a character line is present in the range R1, then a result "Presence of Characters" is attained.

When no character line is present in the range R1, the character line detection is conducted for the second horizontal OR range R2. If a character line is present in the range R2, then the result "Presence of Characters" is attained.

Similarly, when no character line is present in the range R2, the character line detection is performed for the third horizontal OR range R3, the result "Presence of Characters" is attained. If no character line is present in the range R3, then a result "Absence of Characters" is attained In the flow chart of FIG. 10, the character line detections are carried out in the same order as the order or priority. It goes without saying that the order of the character line detections may be reversed.

FIG. 11 shows a flow chart showing the case where the character line detections are carried out in the reverse order.

In the procedure of FIG. 11, a register R is used to temporarily store the distribution of character lines in the "column" direction in a horizontal OR range.

First, the register R is reset to clear its contents.

The character line detections of the horizontal OR ranges R1, R2 and R3 are carried out in the order of R3, R2 and R1—beginning with the range/lowest in the order of priority. If a character line is present in the range R3, then the distribution of character lines is input to the register R, and the character line detection of the next horizontal OR range R2 is performed. If no character line is present in the range R3, then the character line detection of the next horizontal OR range R2 is carried out directly.

The above-described operation is repeated until the character line detection of the range R1 is highest in the order of priority. If a character line is present in the range R1, then the distribution of character lines in the "column" direction is stored in the register R.

If no character line is present in the range R1, directly it is determined whether the register R has been cleared. If a character line is present in the range R1, then after the distribution of character lines is stored in the register R, it is determined whether the register R has been cleared. The fact that the register R has not been cleared means that no character line is present in any one of the horizontal OR ranges. In this case, a result "Absence of Characters" is attained.

When it is determined that the register R has been cleared, a result "Presence of Characters" is attained. The distribution of character lines of the horizontal OR range which is higher in the order of priority is stored in the register R. Thus, the distribution of character lines can be detected with high accuracy.

In the above-described embodiments, after the outputs of the image sensor 26 have been stored in the image memory 28, the horizontal OR operations are performed; however, the invention is not limited thereto or thereby. That is, a method may be employed in which the output signals of the binary-coding circuit 27, which is adapted to drive the image sensor 26 and to binary-code the output of the image sensor 26, are first input to the horizontal OR circuits 1, 1' and so forth, and while the output signals are being stored in the image memory 28, the character line detection is carried out. This method can reduce the time required for performing the character line detection or inputting the signals into the image memory.

There has been described an OCR arrangement wherein (1) both in a price tag large in size and in a price tag small in size, the character lines can be detected with high accuracy. (2) As the presence or absence of a character line can be detected, the identification can be suspended for every empty region, with the result that electric power is economically used. (3) Since it is detected whether a character line is completely in the field of vision, the potential for incorrect identification is eliminated.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of appended claims.

We claim:

1. An optical character reader (OCR) comprising:
a light source for illuminating a sheet on which characters, which may include alpha-numeric characters and symbols, are arranged generally along a horizontal direction of said sheet;
an image sensor having a field of vision covering a plurality of said characters, said image sensor including a plurality of photo-electric conversion elements arranged in a matrix;
a lens system for receiving light reflected from said sheet, to form an image of said characters on said image sensor;
a binary coding circuit for digitalizing outputs of said photo-electric conversion elements, which define picture elements (pixels), of an image in the field of vision of said image sensor, into binary signals representing black and white picture elements;
a hand holdable scanner incorporating said light source, image sensor, lens system and binary coding circuit;
an identifying circuit for identifying characters from binary-coded data, wherein a plurality of prioritized horizontal OR ranges, each defined by two vertical lines are provided in the filed of vision of said image sensor;
a horizontal OR circuit for performing a horizontal OR operation providing an output "1" when, in said horizontal OR ranges at least one of said picture elements arranged in a horizontal direction is a black picture element, and providing an output "0" when said picture elements are all white picture elements, said horizontal OR circuit being provided for each or all of said horizontal OR ranges;
a black position/width detecting section for receiving an output of said horizontal OR circuit, to determine that a character line present when the total width of picture element lines in a vertical direction, which is the result of horizontal OR operations of which said output is "1", is within a predetermined range, said black position/width detecting section being provided for each of said horizontal OR ranges, and wherein with respect to all of said horizontal OR ranges, the presence or absence of a character line is detected; and
means for selecting a highest priority OR range from said plurality of prioritized OR ranges that contain character lines as determined by said black position width detecting section to determine the position of a character line or lines on said sheet.

2. An OCR according to claim 1, wherein a first horizontal OR range and a second horizontal OR range smaller in width than said first horizontal OR range are provided at the center of the field of vision of said image sensor in such a manner that said first and second horizontal OR ranges are laid one on another, and said first horizontal OR range is higher in the order of priority than said second horizontal OR range.

3. An OCR according to claim 1, wherein three horizontal OR ranges are provided at the center, left and right regions of the field of vision of said image sensor, respectively, in such a manner that said three horizontal OR ranges are spaced apart from one another, and said horizontal OR range at the center region is the first in the order of priority, said horizontal OR range at the left region is the second, and the said horizontal OR range at the right region is the third.

4. An optical character reader according to claim 1 wherein three horizontal OR ranges are provided at the center, right and left regions of the field of vision of said image sensor, respectively in such a manner that said three horizontal OR ranges are spaced from one another, and said horizontal OR range at the center region is the first in the order of priority, said horizontal OR ranges at the right region is the second, and said horizontal OR range at the left region is the third.

5. An optical character reader (OCR) comprising:
a light source for illuminating a sheet on which characters, which may include alpha-numeric characters and symbols, are arranged generally along a horizontal direction of said sheet;
an image sensor having a field of vision covering a plurality of said characters, said image sensor including a plurality of photo-electric conversion elements arranged in a matrix;
a lens system for receiving light reflected from said sheet, to form an image of said characters on said image sensor;
a binary coding circuit for digitalizing outputs of said photo-electric conversion elements, which define picture elements (pixels), of an image in the field of vision of said image sensor, into binary signals representing black and which picture elements;
a hand holdable scanner incorporating said light source, image sensor, lens system and binary coding circuit;
an identifying circuit for identifying characters from binary-coded data, wherein a plurality of horizontal OR ranges, each defined by two vertical lines are provided in the field of vision of said image sensor;
a horizontal OR circuit for performing a horizontal OR operation that provides an output "1" when, in said horizontal OR ranges at least one of said picture elements arranged in a horizontal direction is a black picture element, and provides an output "0" when said picture elements are all white picture elements, said horizontal OR circuit being provided for each or all of said horizontal OR ranges;
a black position/width detecting section for receiving an output of said horizontal OR circuit, to determine that a character line is present when the total width of picture element lines in a vertical direction, which is the result of horizontal OR operations of which said output is "1", is within a predetermined range, said black position/width detecting section being provided for each of said horizontal OR ranges, and wherein with respect to all of said horizontal OR ranges, the presence or absence of a character line is detected; and
means for adding or selecting horizontal OR ranges from said plurality of horizontal OR ranges that contain character lines as determined by said black position/width detecting section to determine the position of a character line or lines thereby to achieve character identification.

6. An OCR according to claim 5 wherein said adding means subject said results of character line detection to addition to obtain a total character range in the field of vision when the results of character line detection of said plurality of horizontal OR ranges coincide in position with one another in the vertical direction.

7. An OCR according to claim 5 wherein said selecting means employs the result of character line detection whose position is higher in the vertical direction as a total character range in the field of vision when the results of character line detection of said plurality of horizontal OR ranges do not coincide in position with one another in the vertical direction.

8. An OCR according to claim 5 wherein said selecting means employs said results of character line detection that are lower in said vertical direction to obtain a total character range in the field of vision when the results of character line detection of said plurality of horizontal OR ranges do not coincide in position with one another in the vertical direction.

9. An OCR according to claim 5 wherein said selecting means employs said results of character line detection that are closer to the center in said vertical direction to obtain a total character range in the field of vision when the results of character line detection of said plurality of horizontal OR ranges do not coincide in position with one another in the vertical direction.

* * * * *